United States Patent

Wållberg et al.

[11] Patent Number: 5,736,622
[45] Date of Patent: Apr. 7, 1998

[54] COLLECTOR INTENDED TO BE USED IN DEINKING OF WASTE PAPER ACCORDING TO THE FLOTATION PROCESS

[75] Inventors: Peter Wållberg, Lerum; Enn Päärt, Partille, both of Sweden

[73] Assignee: Bim Kemi AB, Sweden

[21] Appl. No.: 564,364

[22] PCT Filed: Jun. 6, 1994

[86] PCT No.: PCT/SE94/00547

§ 371 Date: Dec. 22, 1995

§ 102(e) Date: Dec. 22, 1995

[87] PCT Pub. No.: WO95/00699

PCT Pub. Date: Jan. 5, 1995

[30] Foreign Application Priority Data

Jun. 23, 1993 [SE] Sweden ............................ 9302174

[51] Int. Cl.6 .................................................. C08G 63/48
[52] U.S. Cl. .................. 528/295.5; 528/272; 528/295.5; 528/296; 528/302; 528/306
[58] Field of Search ................................. 528/272, 295.5, 528/296, 302, 306

[56] References Cited

U.S. PATENT DOCUMENTS

| | | | |
|---|---|---|---|
| 4,010,126 | 3/1977 | Kuzma | 523/501 |
| 4,245,059 | 1/1981 | Ichimura et al. | 525/170 |
| 5,344,859 | 9/1994 | Eichen et al. | 523/501 |

*Primary Examiner*—Samuel A. Acquah
*Attorney, Agent, or Firm*—Klarquist Sparkman Campbell Leigh & Whinston, LLP

[57] ABSTRACT

A collector that is intended to be used at deinking of waste paper according to the flotation process. The collector includes a polyester obtained through reaction between polyalkylene glycol, di and/or tricarboxylic acid and/or anhydrides thereof as well as a saturated fatty acid with 12–18 carbon atoms. The polyester shows a molecular weight between 3000–10000.

11 Claims, 1 Drawing Sheet

COLLECTOR INTENDED TO BE USED IN DEINKING OF WASTE PAPER ACCORDING TO THE FLOTATION PROCESS

BACKGROUND OF THE INVENTION

Around the world the opinion for use of the recycled fibre is now growing. A number of countries have already legislated that a certain part of the total paper production shall be constituted of recycled fibre. The methods, which are used today at deinking are the flotation process and the washing process, where the later is mainly applied in North America. The flotation process, which is most common in Europe, technically originates from the mining industry and is the process being most interesting for our object.

The deinking can be divided in three different steps; 1) dissolution of recycled fibre and discharging printing-ink from the fibres, 2) dispersing printing-ink in the water phase and 3) separation of the printing-ink. These three steps are included in both flotation process and the washing process. The method, which one uses industrial depends on the requirements and conditions which are found where the activity is located. The object of the flotation process concerning the deinking is to remove the very most amount of printing-ink from a recycled fibre suspension. The first step is to solve the fibre and disengage the printing-ink. When this is accomplished the particles must be modified so that they obtain suitable physical and chemical characteristics so that they afterwards can be lifted to the surface and removed with help of air-bubbles.

Some parameters are important to be consider at the flotation, such as the size of the particle, airflow in the flotation cell, the size of the air-bubbles, temperature, flotation time, the concentration of the recycled fibres in the flotation cell, pH, the concentration of the chemicals as well as the degree of the hardness of the water.

The flotation process is carried out in such a manner that the recycled raw material of the fibre is poured out through mechanical treatment in combination with a concentration of the chemicals. Different methods concerning chemicals/the concentration of the chemicals and method to pour the raw material exist. The purpose of the mechanical treatment is that the fibres should be rubbed against each other and that one in that way, together with the chemicals, should get an efficient discharging of print-ink. However, a too strong mechanical influence causes great damages on the fibres and this is not desirable at the paper-making.

Then comes filtering, whereby the particle shaped impurities are separated, followed of a purification step, generally by means of a vortex cleaner, where very little and heavy particles are separated. In a dispersing step the discharge of printing-ink continues through mechanical treatment and chemical influence. Printing-ink and remaining small particles are separated subsequently in the flotation step. Different flotation technics exist and in the more contemporary ones, one can float all small particles by pressurizing the flotation cell. Small impurities are separated through washing and to increase the brightness of the pulp the bleaching is performed through hydrogen peroxide or hydro sulphite.

Following chemicals are used at the deinking:
Sodium hydroxide. (NaOH)

Sodium hydroxide is used to adjust pH to the alkaline level and to saponificate and/or hydrolyse the resin in the printing-ink. The pH at, which the deinking occurs, 9.5–11.0, causes that the fibres swell and thereby become more flexible. Adding NaOH to the mechanical pulps makes the pulp to turn yellow and become dark. The concentration of NaOH must be optimized. The alkalinity must be high enough, as mentioned earlier, to obtain good saponification and hydrolysis of resins, which are included in the printing-inks. A sufficient high pH also gives a good fibre flexibility as well as an optimal function of the hydrogen peroxide. A quandary, as mentioned earlier, is that in the volumes with high lignin content the high alkali content give rise to chromophore groups. These chromophore groups are the reason for the pulp becoming yellow dyed. Experiments done show that the brightness increases with increasing pH when it is increased from 8.6 to 10.2, subsequently the brightness diminishes. Increasing number of magazine paper in the pulp requires additional content of sodium hydroxide. Before the pulp is used for paper making pH is reduced to about 5.5. It is shown that the brightness increases linear with decreasing pH between 8.5 and 5.5. The reason for the brightness increase is not determined entirely but one supposes that it depends on two main factors: agglomeration of the colloidal printing-ink as well as reduction of the number of chromophors.

Hydrogen peroxide. ($H_2O_2$)

Hydrogen peroxide is used to discolour the chromophors, which are originate from alkaline pH in the pulp. The peroxide reacts with the sodium hydroxide according to the following:

$$H_2O_2 + NaOH \rightarrow HOO^- + Na^+ + H_2O$$

when pH=10.0–11.5 and temperature=40°–80° C.

The perhydroxyl anion (HOO−) is the active bleach chemical. The concentration of this, is influenced by the following parameters: pH, temperature, dose of hydrogen peroxide and the concentration of the certain metal ions such as Fe, Mn, Cu and others. The influence of the metal ions can be reduced by adding chelate and sodium silicate. Certain microorganisms can also have negative influence by producing peroxide degrading enzymes.

Sodium silicate

Sodium silicate, or water-glass, is a flotation silicate, which consists of $SiO_2$ and $Na_2O$ in varying mole ratio. Sodium metal silicate has a mole ratio ($Na_2O/SiO_2$) of approximately one and is the one mainly being used within the deinking. This is due to the higher alkalinity of the silicates with the low mole ratio. Actually, the Silicate component is a mixture of many complex polymer silicate anions. By forming colloids with heavy metal ions the sodium silicate prevents a degradation of the hydrogen peroxide. The silicate even prevents the loose printing-ink from reprecipitating on the fibres. The silicate has also a buffering effect on pH. Up to a certain level the brightness of the pulp increases with added concentration of the sodium silicate. However, the concentration of the silicate should be kept as low as possible, since problems with the deinkings in the subsequent equipment have been noted.

Chemicals forming agglomerate

The printing-ink from the office waste form thin flake at the deinking. These are to big to be able to be removed by flotation or washing and to little to be able to be removed through filtration. If a chemical that changes the surface structure of the platform is added, they can be made to form agglomerate, which can be removed, e.g. through centrifugation.

The surface-active substances

The group of surface-active substances include many subgroups. For instance dispersing substances, collectors, substances with wetting characteristics, substances that prevents redeposition and so on, can be mentioned. As a matter of principle, the surface-active substances being used for deinking will have two important components. A portion of the molecule must be hydrophillic and the other one must be of hydrophobic quality. The structure of the surface-active substances can be a straight chain, branched chain, they can have charged groups, long or short chain, double or simple bindings and so on.

Complex builder

DTPA (diethylentriaminpentaacetic acid) is the most used complex builder but EDTA (ethylendiamintetraacetic acid) is also used. The complex builders act by building solvable complexes of heavy metal ions. The complex prevents these ions from breaking down the hydrogen peroxide. DTPA, which has a structure with five "legs" is a more efficient complex builder than EDTA, which has a structure with four "legs".

Today, the waste paper manufacturers largely use a raw material mixture, which normally 30–40% consists of magazine paper and to 60–70% of newspaper. It is possible by sorting magazine paper and newspaper by a reasonably cost-effective method. By knowing, which print methods and printing-inks being used, we can easily understand, which mechanisms and functions that are required in the deinking works. For further operation one must also consider following facts about the printing-inks and printing methods:

Pigment consists of very fine carbon particles.

The carriers consist of mineral or vegetable oils or as well as dissolver, which evaporates.

The printing-ink at printing on newspapers is partly absorbed by the paper and thereby contains oils, which make the colour to not dry completely. The printing-ink on the magazine paper consists of endured pigment on the paper surface, which largely consists of filler. This causes that a smaller amount of colour be adsorbed on the cellulose fibre.

Both foregoing types of printing-inks have a pronounced hydrophobic quality.

Earlier, the chemical system at flotation has been described to give an insight into what effect the different added ingredients have on the deinking. When the collector is added, the printing-ink is dispersed in the water phase. Now it is required to modify the particles so that they obtain characteristics, which makes it easy for them to be flotated.

If one makes the small hydrophillic particles more hydrophobic, this gives a certain agglomeration. This yields heavier particles with a hydrophobic surface structure. An important condition for the particle to come in contact with the air-bubble is that the particle has an appropriate size.

If the particle is to light, it will follow the flow round the bubble and no effect is obtained. If the particle is to heavy a collision with the air-bubble is obtained, however, the adhesive powers are too weak in proportion to its pulp. Therefore, the particle falls off and the flotation effect does not occur. It is therefore very important that the particle is sufficiently big. Earlier experiments have shown that an optimal size for the particle is about 100 μm.

The hydrophobic surface structure favours an adsorption to air-bubbles. The adsorption can be explained using surface chemistry, whereby through an interface between the air and the water the hydrophobic matters are oriented against the air phase. This occurs because it is advantageous from an energy point of view. To be able to achieve a hydrophobing of the particles, one can add a surface-active chemical.

The conventional type of flotation chemical has required a high degree of hardness of the water to obtain intended effect. This acquires problem with depositions in form of $CaCO_3$ in the equipment. For a period there has been different alternatives to the original flotation chemicals, for instance so-called synthetic collector, which do not require a high water hardness.

In SE-B-464 639 a synthetic collector, which consists of a polyester based on a polylalkylene glycol and a di or tricarboxylic acid is described. Tall oil is used of the polymerization reaction to control the chain length of the resulting polymer. The collector produced in this manner is efficient and also non-polluting, as it is biologically degradable. However, there is still place for enhancements, for example the possibility of controlling the polymerization reaction and the chain length of the polyester.

THE OBJECT AND THE MOST IMPORTANT CHARACTERISTICS

The object of the invention is to obtain an efficient synthetic collector, where the polymerization reaction can be controlled in a better way to thereby increase the reproducibility and give a more well-defined product. Naturally, the environmental aspects applying the biological degradability should be satisfied.

This, according to the invention has been achieved by including a polyester obtained through reaction between 1) polylalkylene glycol, 2) di- and/or tricarboxylic acid and/- or anhydrides thereof as well as 3) a saturated fatty acid with 12–18 carbon atoms, and, which polyester shows a molecular weight between 3000–10000.

DESCRIPTION OF THE INVENTION

Figure 1:
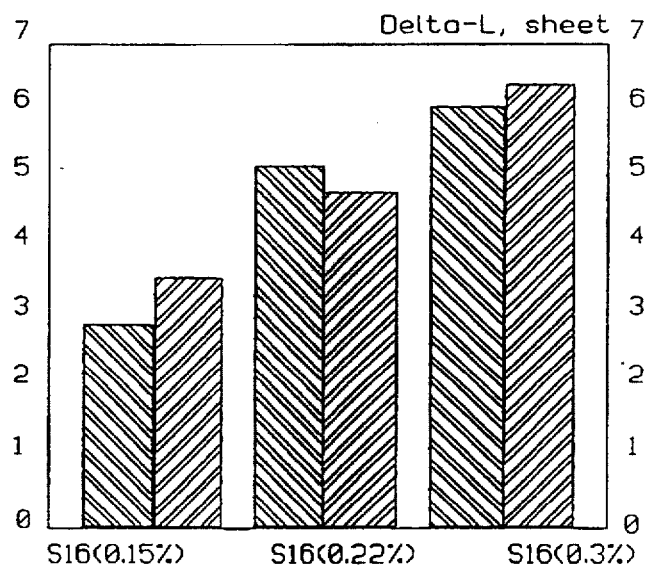
FIG. 1 is a block diagram showing the brightness increase at flotation experiment with a collector according to the invention by different dosages.
Figure 1:
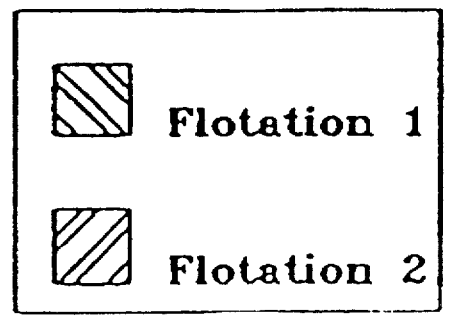

The collector is a polyester made of a polylalkylene glycol and a di and/or tricarboxylic acid or its anhydrides. Preferably, as polylalkylene glycol polyethylene glycol, PEG, $HO-(CH_2-CH_2O)_n-H$ and/or polypropylene glycol, PPG, $HO-(CH_2-CH_2-CH_2O)_n-H$ are used. These can occur in several different molecular weights. We have used PEG as average molecular weight 400.

Preferably, as di or tricarboxylic acid is used maleic acid, fumaric acid, adipic acid, citric acid, oxalic acid or sebacic acid or its anhydrides. Mixtures can also be used.

To obtain a certain chain length a blockage acid at the synthesis is added and in the experiments, already described tall oil (Bevacid-20), myristic acid, lauric acid and stearic acid has been used. Through the polycondensation between PEG and maleine acid a chain with a relative hydrophillic structure caused by carboxyl groups and oxygen atoms is obtained. It is also desired a strong hydrophobic part on the molecule and this characteristic is obtained by choosing a hydrophobic blockage acid. When one varies the polymerisation ratio and the length of the blockage acid, different efficiency with the collector is obtained.

Tall oil consists of 25–30% resin acids and 70–75% fatty acids. The portion of fatty acid in the tall oil is approximately 5% saturated, approximately 25% consists of oil acid and approximately 70% consists of linolenic acid. The mixture of different fatty acids makes it difficult to decide the appearance of the collector, but if estimation is done one can establish that the half the tall oil consists of linolenic acid.

According to the invention three saturated fatty acids with 18, 14 and 12 carbon atoms respectively, i.e. stearic acid, myristic acid and lauric acid have been tested as blockage acids. To be able to study how the chain length of the molecules affected the collector function, synthesis with calculated molecular weights (Mn) of 3000, 5000 and 7000 were made. The average molecular weight should be between 3000–10000.

A polyester was formed by gradually polymerization between two bi or multifunctional monomers. By a bifunctional monomer is meant a molecule with two functional groups. The reaction is also called condensation polymerization because the water is separated.

EXAMPLE

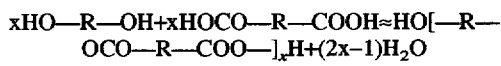

Generally, condensation polymers are formed through gradually intermolecular condensation of reactive groups. Condensation polymers can also be formed through additional polymerisation. Bifunctional monomers give linear polymers, while polyfunctional gives branched or cross linked polymers. To interrupt the reaction one usually uses a monofunctional acid, which is called blockage acid.

To obtain a linear polymeric with high molecular weight the exchange must be much higher. A ratio of a transformer of 90%, for instance gives only one average of 10 repeating units in the chain. High exchange is obtained for instance by means of displacing the equilibrium in the above reaction to right. It is also important that the monomers are added in equimolar quantities and there are no impurities present. The temperature should not be too high, since there is a risk of bireaction, which leads to cross-linkage and branching. To obtain a faster polymerization one usually adds a strong acid as catalyst, for instance sulphuric acid or p-toluensulphonic acid. It is also possible to use certain tin organic combinations as catalysts.

The prerequisite for gradually polymerization is following:

any of the two present reactants can react.

the concentration of the monomer decreases fats in the beginning of the reaction.

the molecular weight of the polymer increases whole the time during the reaction.

long reaction time is necessary to obtain high molecular weight.

Synthesis of the collector

The included raw materials were poured in a flange flask, the heating was started and the catalyst added. Timekeeping was started when the catalyst was added. Nitrogen was conducted in the mixture to obtain a certain stirring as well as to prevent oxygen supply. To improve the stirring a magnetic agitator was used. Water suction was used since low pressure lowers both partial pressures of water vapour in the flask and the boiling point at the reaction mixture.

To be able to obtain a controlled temperature increase as well as be able to carry out the synthesis at a constant temperature an adjustable transformer was connected to the heat casing. The synthesis went on in about three hours. Sometimes the synthesis was interrupted earlier because the mixture became too viscous or a certain acid ratio was obtained. At regular intervals samples for control of the acid ratio were taken.

The synthesis was accomplished at 150°, 175° and 200° C. respectively to be able to study the impact of the synthesis temperature on the molecular weight. For each synthesis a double sample is performed to control the reproducibility for the synthesis. After each synthesis the amount of the given water was measured and this condensate was controlled by means of FTIR. The synthesis product was characterized by means of FTIR (Fourier Transform Infrared Spectroscopy), acid ratio, viscosity and in a certain case even by means of NMR (Nuclear Magnetic Resonance), clouding point and PLC (High Pressure Liquid Chromatography).

When a surface-active substance is present as a diluted water solution, during the clouding point, the molecules are dissolved well. If the temperature is increased, the molecules begin to approach each other more and more. Finally it is visible when the solution becomes milky. This is called the clouding point. Because of this it is important that the molecule is designed with regard to the flotation temperature. A number of different collectors were produced according to following recipe and reaction conditions:

| COLLECTOR 1, 2, 4 | COLLECTOR 3, 5 | COLLECTOR 6, 7 |
|---|---|---|
| Reaction time: 240, 210, 210 min resp. 150° C. | Reaction time: 165 and 150 min resp. 175° C. otherwise | Reaction time: 180 and 150 min 200° C. otherwise |
| Maleic acid 102 g | as 1, 2 | as 1, 2 |
| PEG 400 461 g | | |
| Tall oil 35 g | | |

| COLLECTOR 8, 9 | COLLECTOR 10, 11 | COLLECTOR 12, 13 |
|---|---|---|
| Reaction time: 210 and 195 min rasp. 150° C. | Reaction time: 155 and 180 min rasp. 175° C. otherwise | Reaction time: 188 and 180 min 200° C. otherwise |
| Madein acid 116 g | as 8, 9 | as 8, 9 |
| PEG 400 400 g | | |
| Tall oil 40 g | | |

| COLLECTOR 14 | COLLECTOR 15, 17 | COLLECTOR 16 |
|---|---|---|
| Reaction time: 180 min. 175° C. | Reaction time: 180 min. 150° C. otherwise | Reaction time: 150 min. 200° C. otherwise |
| Maleic acid 102 g | as 14 | as 14 |
| PEG 400 461 g | | |
| Stearic acid 40 g | | |

| COLLECTOR 18 | COLLECTOR 19 | COLLECTOR 20 |
|---|---|---|
| Reaction time: 210 min. 150° C. | Reaction time: 180 min. 150° C. | Reaction time: 210 min. 150° C. |
| Maleic acid 116 g | Maleine acid 116 g | Maleine acid 116 g |
| PEG 400 400 g | PEG 400 400 g | PEG 400 400 g |
| Tall oil 103 g | Stearic acid 108 g | Tall oil 57 g |

| COLLECTOR 21 | COLLECTOR 22 | COLLECTOR 23 |
|---|---|---|
| Reaction time: 180 min. 150° C. | Reaction time: 180 min. 150° C. | Reaction time: 180 min. 150° C. |
| Maleic acid 116 g | Maleine acid 116 g | Maleine acid 116 g |
| PEG 400 400 g | PEG 400 400 g | PEG 400 400 g |
| Stearic acid 60 g | Myristic acid 34 g | Lauric acid 30 g |

| COLLECTOR 24 | COLLECTOR 25 | COLLECTOR 26 |
|---|---|---|
| Reaction time: 180 min. 150° C. | Reaction time: 240 min. 150° C. | Reaction time: 150 min. 200° C. |
| Maleic acid 116 g | Fumaric acid 116 g | Fumaric acid 102 g |
| PEG 400 400 g | PEG 400 400 g | PEG 400 461 g |
| Lauric acid 76 g | Myristic acid 34 g | Stearic acid 40 g |

-continued

COLLECTOR 27

Reaction time:
115 min.
150° C.
Fumaric acid 116 g
PEG 400    400 g
Stearic acid 40 g In all synthesis other than 1 and 6, 1 ml concentrated sulphuric acid solved in 2 ml water was used as catalyst. In synthesis 1 no catalyst was used and in synthesis 6 methane sulphone acid was used.

In table 1 below synthesis data is shown.

TABLE 1

| COL-LECTOR | Blockage acid | SYN-THESIS TEMP. °C. | Acid ratio | VISCOSITY, mpas.23° C. | CATALYST, TEOR.MW g/mole, synth. time, Min. |
|---|---|---|---|---|---|
| 1 | Tall oil | 150 | 49.5 | 653 | no, —, 240 |
| 2 | — | — | 15.5 | 3210 | yes, —, 210 |
| 3 | — | 175 | 8.1 | 5380 | yes, —, 165 |
| 4 | — | 150 | 7.8 | 2640 | yes, —, 210 |
| 5 | — | 175 | 9.5 | 4960 | yes, —, 150 |
| 6 | — | 200 | 11.3 | 2100 | yes, —, 180 |
| 7 | — | — | 7.7 | >10000 | yes, —, 150 |
| 8 | — | 150 | 15.1 | >10000 | yes, 7000, 210 |
| 9 | — | — | 22.8 | 8720 | yes, 7000, 195 |
| 10 | — | 175 | 12.5 | >10000 | yes, 7000, 155 |
| 11 | — | — | 16.4 | >10000 | yes, 7000, 180 |
| 12 | — | 200 | 12.4 | >10000 | yes, 7000, 180 |
| 13 | — | — | 12.8 | >10000 | yes, 7000, 180 |
| 14 | C-18 | 175 | 4.7 | >10000 | yes, —, 180 |
| 15 | — | 150 | 7.6 | >10000 | yes, —, 180 |
| 16 | — | 200 | 3.1 | >10000 | yes, —, 150 |
| 17 | — | 150 | 6.1 | >10000 | yes, —, 180 |
| 18 | Tall oil | — | 38.2 | 3710 | yes, 3000, 210 |
| 19 | C-18 | — | 33.0 | >10000 | yes, 3000, 180 |
| 20 | Tall oil | — | 27.3 | 6830 | yes, 5000, 210 |
| 21 | C-18 | — | 32.3 | >10000 | yes, 5000, 180 |
| 22 | C-14 | — | 22.4 | >10000 | yes, 7000, 180 |
| 23 | C-12 | — | 31.5 | >10000 | yes, 7000, 180 |
| 24 | — | — | 33.1 | >10000 | yes, 3000, 180 |
| 25 | C-14 | 150 | 25.3 | >10000 | yes, 7000, 240 |
| 26 | C-18 | 200 | 5.4 | >10000 | yes, —, 150 |
| 27 | C-18 | 150 | 58 | >10000 | yes, 7000, 115 |

C-18 in the table signifies technical stearic acid
C-14 signifies myristic acid
C-12 signifies lauric acid Polymer calculations The amount of the included reactant was calculated through following method:

The average polymerisation ratio, $X_n$, which is the number of bifunctional molecules at the beginning of the reaction divided by the total number of polymer molecules, is calculated according to following:

$$X_n = (1+r)/(1+r-2xrxp) \quad (1)$$

but also according to $$X_n = M_n/m \quad (2)$$

where $M_n$ = the average molecular weight m = the molecular weight for the repeating unit in the molecule $r = N_A/N_B < 1$ p = ratio of transformation If p is set to 1, then it is obtained:

$$X_n = (1+r)/(1-r) \rightarrow r = (X_n-1)(X_n+1) \quad (3)$$

The amount of blockage acid is calculated according to following:

$$r = (N_A)/(N_A + 2N_B)$$

By stoic measurement balance $N_A = N_B$ and thereby becomes:

$$N_B = (N_B - N_B x r)/r \quad (4)$$

where $N_A$ and $N_B$ is the number of bifunctional molecules and $N_B$ is the number of monofunctional molecules, i.e. the blockage acid.

To calculate the number of blockage acid the desired molecular weight was firstly decided. Subsequently $X_n$ according to (2) was calculated. By means of (3) and (4) the number of blockage acid could be calculated later.

Acid ratio determination

Approximately 2 g sample was weighed in a 300 ml E-flask. 100 ml ethanol was poured in a 300 ml E-flask and 15–20 drops phenolphthalein solution (0.05%) was added. The ethanol was titrated with 0.1M KOH until light rose alteration (only some drops) and was added to the saturated test. Agitation was applied until the test was solved. The test solution was titrated until rose-coloured alternation and amount of required ml KOH was read off. The titration must be performed fast, since $CO_2$ from air is solved in the solution and uses KOH.

Calculation

Acid ratio = $M \times k \times V/m = 56.1 \times 0.1 \times V/m = 5.61 \times V/m$ M = mole weight of potassiumhydroxide (56.1)

k = concentration of the KOH-solution

V = number of ml KOH consumed by the titration m = weighted amount of sample in g Flotation experiment with the collector Daily and magazine newspapers were torn to pieces in approximately 4×4 cm pieces. After control of the dryness the newspapers and water as well as chemicals were collected in a pulper vessel. After slushing the pulp slurry is allowed to rest after, which pH was controlled. Subsequently the slurry was further grinded with an Ultra-Turrax to obtain a more complete fibre release. The pulp was poured in the flotation cell and water was added. If the collector was not added in connection with the initial slushing we added it before the flotation. The flotation was started. During the above mentioned steps we held a slurry temperature of 40° or 45° C., depending on flotations receipt. pH was measured after the slushing. Sample for manufacturing brightness sheet and control of white water purity (see below) was taken before and after the flotation. Also, the sample was taken of the foam from the scrape.

At the tests 150 g paper raw material in 70% newspaper and 30% magazine paper, 2.5 l water (40° C.), 3.2 g water-glass (46.8%)–1% dosage of dry rich pulp, 1.5 g NaOH–1% dosage, 0.45 g surfactant–0.3% dosage (was reduced later to 0.075 g, i.e. 0.05% dosage) were used. The mixture diluted to 5% pulp concentration and slushed in a pulper for 5 min. It swelled subsequently in 1 h after, which slushing occurred for 5 min. pH was measured until the mixture was diluted to 10 litre and stirred.

The slurry was poured in the flotation cell, which was filled with 40° C. water. 1 litre was taken out for production of the brightness sheet and control of the white water purity. The flotation chemicals were added in form of 0.75 g collector–0.5% dosage. At flotation with soap based collector 0.3 g–0.2% dosage was added. Also, 1.78 g CaCl$_2$ was added to obtain 7° dH.

The flotation was accomplished in 30 min. After the flotation, 10 litres were tapped from the cell and the sample was taken for brightness sheet and the water phase.

Brightness sheet

Brightness sheet was made according to SCAN standard C11:75. 1 litre sample was taken out from the flotation cell and poured in mixer so that the fibres were separated from each other. The mixture diluted to 2 litre and pH adjusted to 4.0–5.5. 4samples of 0.5 litres were sucked out in Büchner funnel with the diameter of 11 cm. The sheet was pressed or rolled and dried in room temperature. The brightness was decided subsequently.

White water purity

The white water was controlled by following method: 200 ml suspension was taken out from the cell and fibres were filtered by a net basket. 60 ml of the filtrate was filtered through Munchtell filter paper type 00A (diameter=5.5 cm). After drying was measured the brightness.

In table 2 the acid ratio as well as the brightness increase (Δ-brightness) for the different collectors are indicated.

TABLE 2

| COLLECTOR | Δ-brightness (ISO R457) | |
|---|---|---|
| | White water | Brightness sheet |
| 1 | — | 2.11 |
| 2 | — | 2.12 |
| 2 | 2.97 | 3.40 |
| 3 | — | 2.85 |
| 4 | 3.17 | 2.48 |
| 4 | 3.30 | 3.61 |
| 5 | 6.49 | 1.97 |
| 6 | 4.33 | 3.90 |
| 6 | 3.17 | 3.65 |
| 7 | 0.44 | 3.09 |
| 7 | 3.46 | 3.17 |
| 8 | 2.38 | 3.63 |
| 8 | 3.74 | 2.85 |
| 9 | 4.24 | 3.66 |
| 10 | 7.77 | 4.70 |
| 10 | 3.84 | 4.32 |
| 11 | 5.56 | 3.89 |
| 0-sample | 2.64 | 3.71 |
| 0-sample | 1.52 | 0.73 |
| Soap (0.2%) | 5.57 | 5.14 |
| Soap (0.2%) | 4.02 | 1.34 |
| Tenneco (0.5%) | 4.40 | 2.32 |
| Tenneco (0.5%) | 2.05 | 1.90 |
| Bimex 400 (0.5%) | 3.74 | 4.11 |

Result

Totally, 27 collectors were manufactured. By the attempts carried out, it was reviled that a collector based on polyethylene glycol, maleic acid and stearic acid gave the best result. The molecular weight for the collector has been determine to approximately 6500 through HPLC. The clouding point was 57° C. The composition of the products and average molecular weight was controlled by means of NMR, FTIR and HPLC.

The viscosity measurements point out that the molecular weight increases with the synthetic temperature. Possibly a certain cross linking at higher temperature. Small differences in acid ratio but great differences in viscosity between the collector made at different synthetic temperatures indicates this.

The clouding point of the collector should be in few degrees above the flotation temperature. We recommend that a number of different collectors are produced or optimal performance when the flotation temperature varies between different deinking plants.

It has not been able to indicate any connections between the flotation effect and the acid ratio. We have been able to discern better flotation result for products with higher viscosities. By comparisons between the different blockage acids the stearic acid has given best flotation result. Tall oil as blockage acid has given uneven flotation result, which perhaps can be explained through its any complicated composition.

Figure 2:
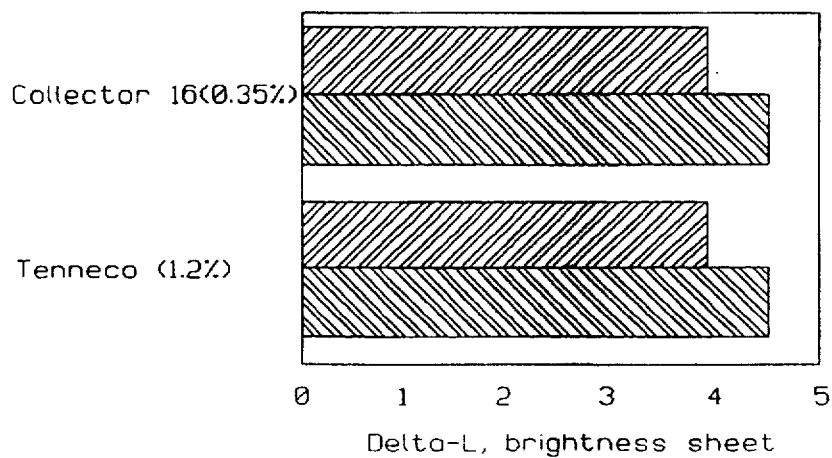
FIG. 2 is a block diagram showing the brightness increase at flotation experiment with a collector according to the invention and a commercial collector.

For the best collector, no 16, we optimized the dosage. Experiment with increasing concentration show that 0.3% concentration collector gave best result. Higher amount gave poor flotation result. The results are shown in FIG. 1. Comparing the experiment with a calcium stearate based commercial collector, Tenneco®, and the collector 16 according to the invention showed that, to attain same Δ-brightness, 4.5 units (ISO-R457), on brightness sheet as for a concentration of 0.35% collector 16, a concentration of 1.2% of Tenneco® was demanded, i.e. 3.5 times higher dosage. These results are shown in FIG. 2.

We claim:

1. A composition for deinking waste paper according to the flotation process, the composition comprising
a polyester obtained through reaction of (1) a polyalkylene glycol, (2) a dicarboxylic acid, a tricarboxylic acid, an anhydride of a dicarboxylic acid, an anhydride of a tricarboxylic acid, and combinations thereof, and (3) a saturated fatty acid having from about 12 to about 18 carbon atoms, the polyester having a molecular weight of from about 3,000 to about 10,000 daltons.

2. The composition according to claim 1, wherein the polyalkylene glycol, dicarboxylic acid, tricarboxylic acid, anhydride of a dicarboxylic acid and anhydride of a tricarboxylic acid are aliphatic compounds.

3. The composition according to claim 2, wherein the polyalkylene glycol is selected from the group consisting of polyethylene glycol, polypropylene glycol and combinations thereof.

4. A method for using a polyester as a collector for deinking waste paper according to the flotation process, comprising:
obtaining a polyester having a molecular weight of from about 3,000 to about 10,000 daltons, the polyester being produced by a reaction between 1) a polyalkylene glycol, 2) a di and/or tricarboxylic acid and/or anhydrides thereof, and 3) a saturated fatty acid having from about 12 to about 18 carbon atoms; and
using the polyester as a collector for deinking waste paper according to the flotation process.

5. The composition according to claim 1 wherein the dicarboxylic acid is selected from the group consisting of maleic acid, fumaric acid, adipic acid, oxalic acid, sebacic acid, and combinations thereof.

6. A composition for deinking waste paper according to the flotation process, the composition comprising a polyester obtained through reaction of a polyalkylene glycol, citric acid, and a saturated fatty acid having from about 12 to about 18 carbon atoms, the polyester having a molecular weight of from about 3,000 to about 10,000 daltons.

7. The composition according to claim 1 wherein the polyester has a molecular weight of from about 5,000 to about 10,000 mass units.

8. A composition for deinking waster paper according to the flotation process, the composition comprising a polyester obtained through reaction of 1) a polyalkylene glycol, 2) a dicarboxylic acid, a tricarboxylic acid, an anhydride of a dicarboxylic acid, an anhydride of a tricarboxylic acid, and combinations thereof, and 3) a saturated fatty acid selected from the group consisting of stearic acid, myristic acid, lauric acid, and combinations thereof, the polyester having a molecular weight of from about 3,000 to about 10,000 daltons.

9. The composition according to claim 1 wherein the polyalkylene glycol is polyethylene glycol, the dicarboxylic acid is maleic acid, and the saturated fatty acid is stearic acid.

10. A collector for deinking waste paper, the collector being produced by the process comprising:

forming a mixture comprising, prior to reaction, (1) a polyalkylene glycol, (2) a dicarboxylic acid, a tricarboxylic acid, an anhydride of a dicarboxylic acid, an anhydride of a tricarboxylic acid, and combinations thereof, and (3) a saturated fatty acid having from about 12 to about 18 carbon atoms; and heating the mixture at a temperature and for a sufficient period of time to form a collector having a molecular weight of from about 3,000 to about 10,000 daltons.

11. A polyester ink collector produced by reaction of maleic acid, PEG 400 and stearic acid.

* * * * *

UNITED STATES PATENT AND TRADEMARK OFFICE
CERTIFICATE OF CORRECTION

PATENT NO. : 5,736,622

DATED : April 7, 1998

INVENTOR(S) : Peter Wallberg and Enn Paart

It is certified that error appears in the above-indentified patent and that said Letters Patent is hereby corrected as shown below:

In column 1, line 66, delete "flexible," and insert therefor --flexible.--

In column 6, lines 49 (both occurrences) and 57 (both occurrences), delete "Maleine" and insert thereof --Maleic--.

In column 9, line 67, delete "or" and insert therefor --for--.

Signed and Sealed this

Sixteenth Day of November, 1999

Attest:

Q. TODD DICKINSON

Attesting Officer     Acting Commissioner of Patents and Trademarks